United States Patent
Ikebe et al.

(10) Patent No.: US 11,735,366 B2
(45) Date of Patent: Aug. 22, 2023

(54) MULTILAYER CERAMIC ELECTRONIC COMPONENT AND METHOD FOR MANUFACTURING THE SAME

(71) Applicant: Murata Manufacturing Co., Ltd., Nagaokakyo (JP)

(72) Inventors: Syouta Ikebe, Nagaokakyo (JP); Yasuhiro Nishisaka, Nagaokakyo (JP); Takefumi Takahashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 3 days.

(21) Appl. No.: 17/378,822

(22) Filed: Jul. 19, 2021

(65) Prior Publication Data

US 2022/0068566 A1 Mar. 3, 2022

(30) Foreign Application Priority Data

Aug. 31, 2020 (JP) .................. 2020-145622

(51) Int. Cl.
*H01G 4/30* (2006.01)
*H01G 4/012* (2006.01)
*H01G 4/08* (2006.01)
*H01G 4/008* (2006.01)
*H01G 4/12* (2006.01)

(52) U.S. Cl.
CPC .............. *H01G 4/30* (2013.01); *H01G 4/008* (2013.01); *H01G 4/012* (2013.01); *H01G 4/085* (2013.01); *H01G 4/1218* (2013.01)

(58) Field of Classification Search
CPC .......... H01G 4/30; H01G 4/008; H01G 4/012; H01G 4/085; H01G 4/1218
See application file for complete search history.

(56) References Cited

U.S. PATENT DOCUMENTS

| | | | | |
|---|---|---|---|---|
| 4,766,409 A | * | 8/1988 | Mandai | H01C 7/021 338/25 |
| 10,366,834 B1 | * | 7/2019 | Lee | H01G 4/248 |
| 10,770,232 B2 | * | 9/2020 | Han | H01G 4/232 |
| 11,302,480 B2 | * | 4/2022 | Takahashi | H01G 4/2325 |
| 2010/0290172 A1 | * | 11/2010 | Motoki | H01G 4/2325 427/79 |
| 2011/0252629 A1 | * | 10/2011 | Kunishi | H01G 4/30 29/592.1 |
| 2019/0385795 A1 | * | 12/2019 | Yang | H01G 4/30 |

(Continued)

FOREIGN PATENT DOCUMENTS

| | | | | |
|---|---|---|---|---|
| CN | 101336461 A | * | 12/2008 | ............. H01G 4/105 |
| CN | 111128549 A | * | 5/2020 | ............. H01G 4/005 |
| CN | 111199830 A | * | 5/2020 | ............. H01G 13/00 |

(Continued)

OTHER PUBLICATIONS

Office Action in JP2020-145622, dated Mar. 7, 2023, 2 pages.

*Primary Examiner* — Dion R. Ferguson
(74) *Attorney, Agent, or Firm* — Keating & Bennett, LLP

(57) ABSTRACT

A multilayer ceramic electronic component includes a multilayer body and an outer electrode on each end surfaces of the multilayer body. The outer electrode includes an underlying electrode layer and a plating layer on the underlying electrode layer. Void portions inside the underlying electrode layer are each filled with a barrier film. The barrier film is formed by an atomic layer deposition method.

18 Claims, 9 Drawing Sheets

(56) References Cited

U.S. PATENT DOCUMENTS

2021/0366654 A1* 11/2021 Iguchi .................... H01G 4/248
2022/0068566 A1* 3/2022 Ikebe ..................... H01G 4/012

FOREIGN PATENT DOCUMENTS

| DE | 102004005664 B4 * | 12/2018 | ............... C03C 8/20 |
|----|----|----|----|
| JP | 2867748 B2 * | 3/1999 | |
| JP | 2001044069 A | 2/2001 | |
| JP | 2008-159965 A | 7/2008 | |
| JP | 2019-096862 A | 6/2019 | |
| JP | 2019-117942 A | 7/2019 | |
| KR | 20220020645 A * | 2/2022 | |
| WO | WO-2022059390 A1 * | 3/2022 | |

* cited by examiner

SECTIONAL VIEW TAKEN ALONG LINE III-III

MULTILAYER CERAMIC ELECTRONIC COMPONENT AND METHOD FOR MANUFACTURING THE SAME

CROSS REFERENCE TO RELATED APPLICATIONS

This application claims the benefit of priority to Japanese Patent Application No. 2020-145622 filed on Aug. 31, 2020. The entire contents of this application are hereby incorporated herein by reference.

BACKGROUND OF THE INVENTION

1. Field of the Invention

The present invention relates to a multilayer ceramic electronic component and a method for manufacturing the same.

2. Description of the Related Art

In recent years, multilayer ceramic electronic components, represented by multilayer ceramic capacitors, have been increasingly used in harsher environments than in the past.

Such a common multilayer ceramic capacitor includes a capacitive element (component main body) in which multiple ceramic layers and multiple inner electrodes are laminated and outer electrodes on the outer surfaces of the capacitive element. The inner electrodes extend to end surfaces or side surfaces of the capacitive element and are connected to the outer electrodes. For example, the outer electrodes include underlying electrodes formed by applying and firing a conductive paste and plating layers formed on the outer surfaces of the underlying electrodes. Each of the plating layers may include multiple layers, as needed.

For example, Japanese Unexamined Patent Application Publication No. 2019-96862 discloses a multilayer ceramic capacitor including a first electrode layer containing titanium nitride (TiN) formed by an atomic layer deposition method on the entire surface of a main body including dielectric layers and inner electrodes and second electrode layers disposed on the first electrode layer in order to improve the moisture resistance reliability of the multilayer ceramic capacitor. In the multilayer ceramic capacitor disclosed in Japanese Unexamined Patent Application Publication No. 2019-96862, the formation of the thin and dense first electrode layer on the main body enables the main body to have sufficient moisture resistance reliability even when outer electrodes have a small thickness, and the first electrode layer functions to suppress the penetration of moisture from the outside into the inner electrodes.

In recent years, the miniaturization of multilayer ceramic capacitors has been rapidly progressing, and the multilayer ceramic capacitors have been required to have further improved characteristics, higher reliability, and lower resistance.

In the multilayer ceramic capacitor disclosed in Japanese Unexamined Patent Application Publication No. 2019-96862, however, a problem arises in which higher moisture resistance reliability results in an increase in equivalent series resistance (ESR), and the moisture resistance reliability and ESR are in a trade-off relationship. Thus, there is a need for a multilayer ceramic capacitor that can stably achieve both high reliability and low resistance, even in a smaller size.

SUMMARY OF THE INVENTION

Preferred embodiments of the present invention provide multilayer ceramic capacitors each having improved moisture resistance reliability due to the reduction or prevention of the penetration of moisture from outside to inside of the multilayer ceramic capacitor and also having low ESR.

A multilayer ceramic electronic component according to a preferred embodiment of the present invention includes a multilayer body including multiple ceramic layers and multiple inner electrode layers that are laminated, a first main surface and a second main surface opposite each other in the height direction, a first side surface and a second side surface opposite each other in the width direction perpendicular or substantially perpendicular to the height direction, and a first end surface and a second end surface opposite each other in the length direction perpendicular or substantially perpendicular to the height direction and the width direction, a first outer electrode on the first end surface, and a second outer electrode on the second end surface, wherein each of the first outer electrode and the second outer electrode includes an underlying electrode layer and a plating layer on the underlying electrode layer, and multiple void portions inside the underlying electrode layer are each filled with a barrier film.

In multilayer ceramic electronic components according to preferred embodiments of the present invention, the multiple void portions inside the underlying electrode layer are filled with the barrier films. This is able to reduce or prevent the penetration of moisture from the outside into the multilayer bodies and thus enables the multilayer ceramic electronic components to each have improved moisture resistance reliability.

Additionally, when the barrier film is disposed on a portion of the surface of the underlying electrode layer, the multilayer ceramic electronic components are each able to have lower ESR because continuity between the inner electrode layers and the plating layers is achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Multilayer Ceramic Capacitor

Figure 1:
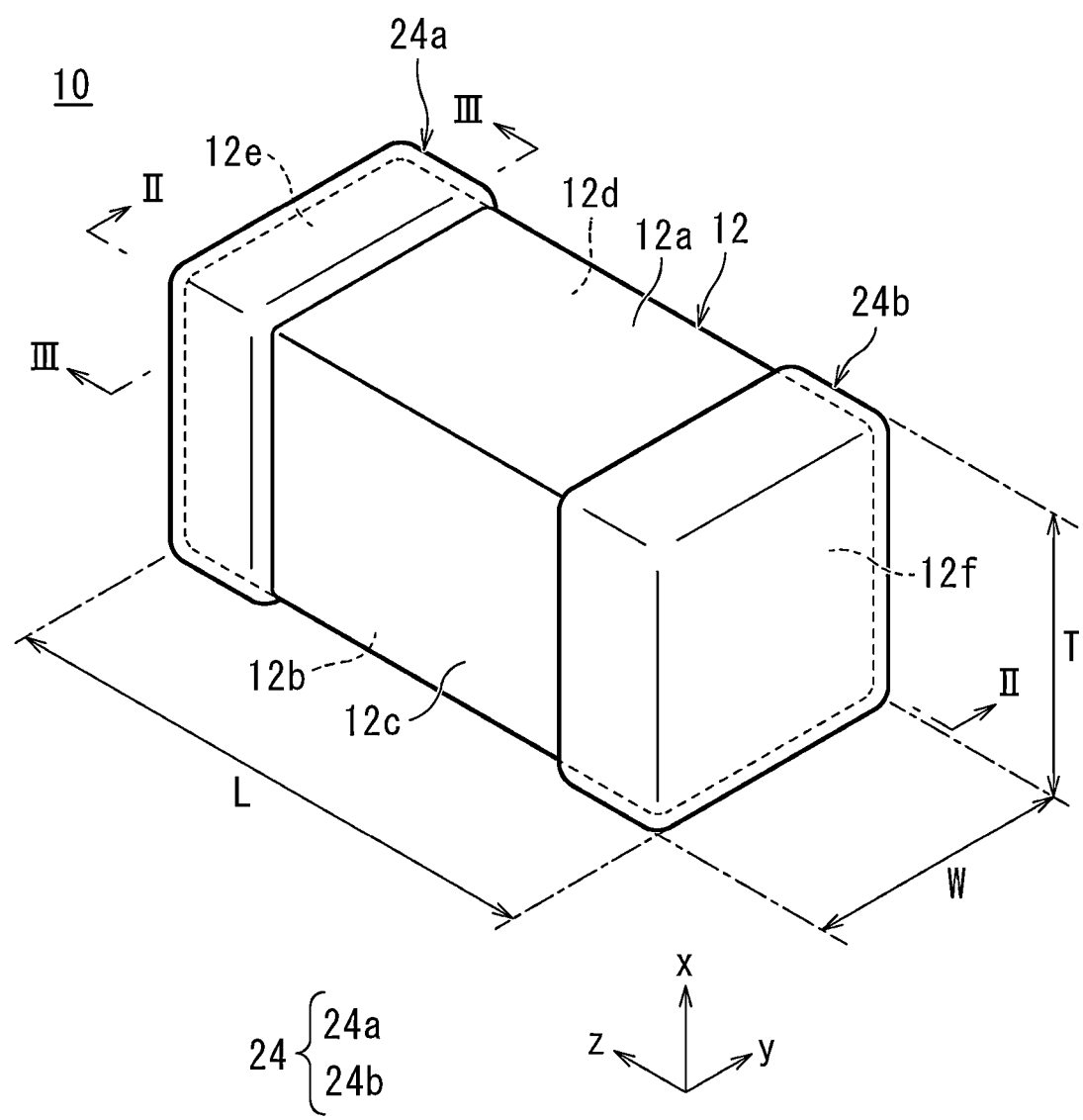
FIG. 1 is a perspective view of a multilayer ceramic capacitor according to a preferred embodiment of the present invention.
Figure 2:
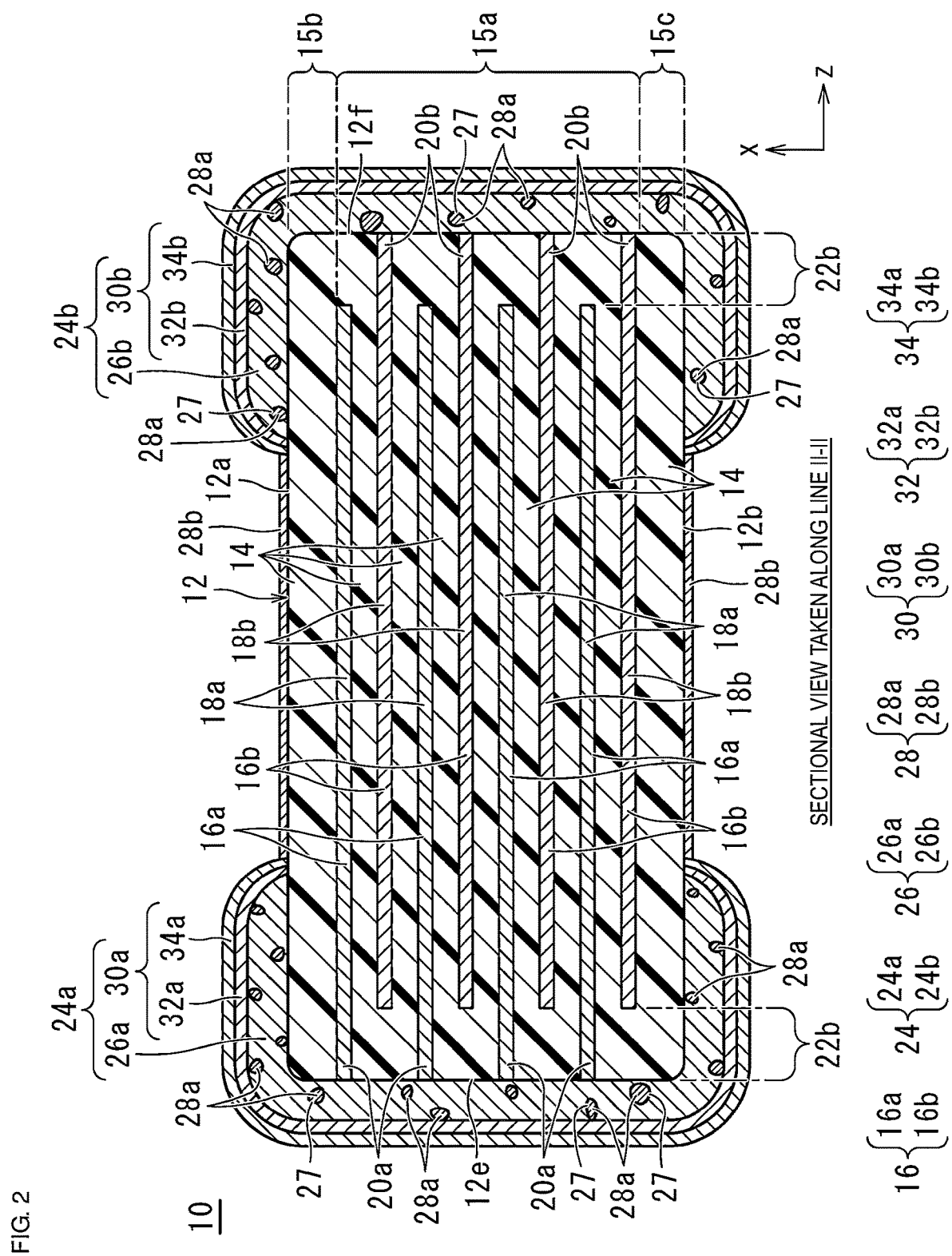
FIG. 2 is a sectional view taken along line II-II of FIG. 1.
Figure 3:
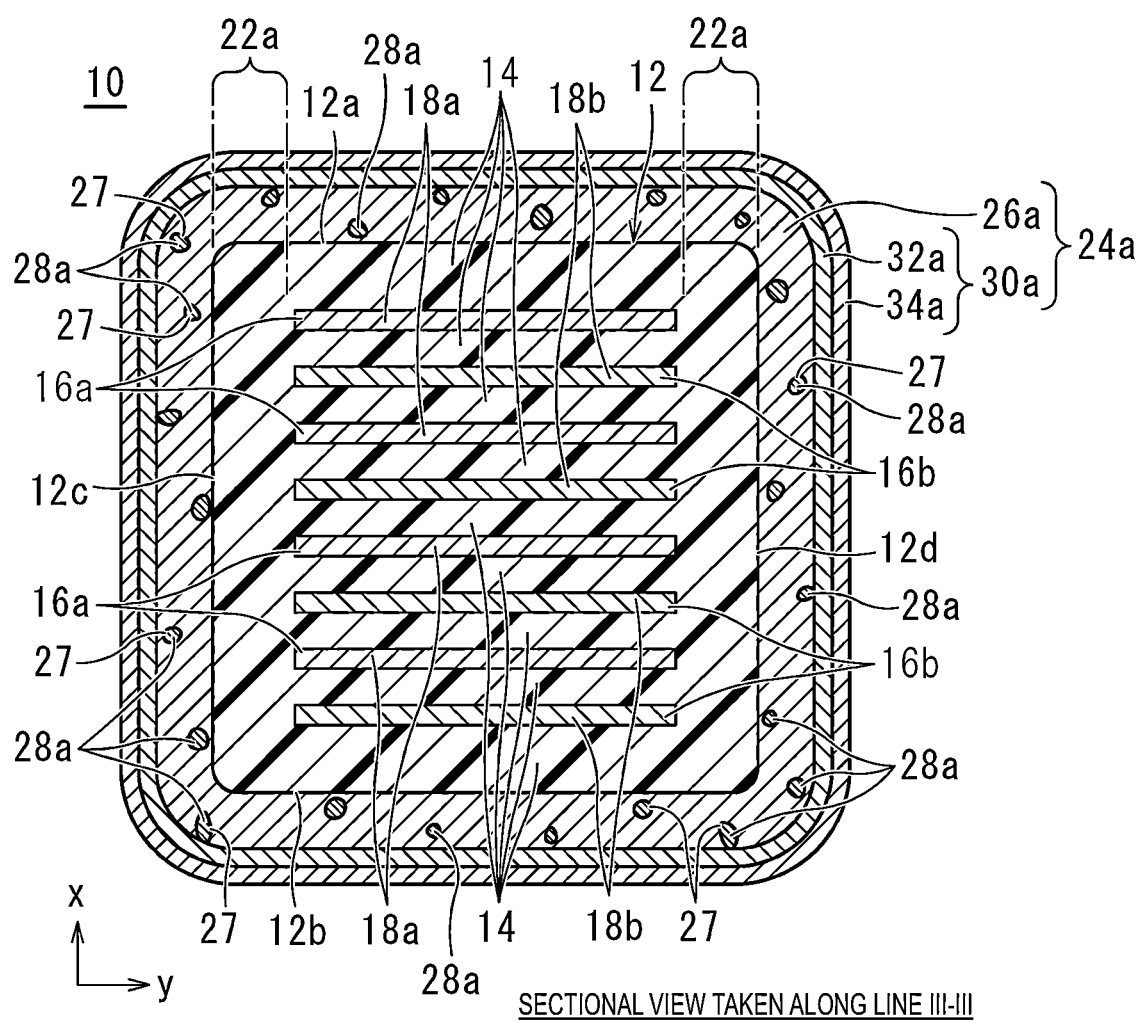
FIG. 3 is a sectional view taken along line III-III of FIG. 1.

As an example of a multilayer ceramic electronic component according to a preferred embodiment of the present invention, a multilayer ceramic capacitor will be described below. FIG. 1 is a perspective view of an example of a multilayer ceramic capacitor according to a preferred embodiment of the present invention. FIG. 2 is a sectional view taken along line II-II of FIG. 1. FIG. 3 is a sectional view taken along line III-III of FIG. 1.

As illustrated in FIGS. 1 to 3, a multilayer ceramic capacitor 10 includes a multilayer body 12 having a rectangular or substantially rectangular parallelepiped shape.

The multilayer body 12 includes multiple ceramic layers 14 and multiple inner electrode layers 16 that are laminated. The multilayer body 12 further includes a first main surface 12a and a second main surface 12b opposite each other in the height direction x, a first side surface 12c and a second side surface 12d opposite each other in the width direction y perpendicular or substantially perpendicular to the height direction x, and a first end surface 12e and a second end surface 12f opposite each other in the length direction z perpendicular or substantially perpendicular to the height direction x and the width direction y. The multilayer body 12 preferably includes substantially rounded corner portions and substantially rounded ridge portions. Each of the corner portions refers to a portion where three adjacent surfaces of the multilayer body meet. Each of the ridge portions refers to a portion where two adjacent surfaces of the multilayer body meet. Protrusions and recesses or the like may be provided in the entire or a portion of each of the first main surface 12a, the second main surface 12b, the first side surface 12c, the second side surface 12d, the first end surface 12e, and the second end surface 12f. The dimension of the multilayer body 12 in the length direction z is not necessarily longer than the dimension thereof in the width direction y.

The number of the ceramic layers 14 is, including the outer layer portions, preferably 15 or more and 700 or less, for example.

The multilayer body 12 includes, in the lamination direction connecting the first main surface 12a and the second main surface 12b, an effective layer portion 15a including the inner electrode layers 16 facing each other, a first outer layer portion 15b between the inner electrode layer 16 closest to the first main surface 12a and the first main surface 12a, and a second outer layer portion 15c between the inner electrode layer 16 closest to the second main surface 12b and the second main surface 12b.

The first outer layer portion 15b is adjacent to the first main surface 12a of the multilayer body 12 and is an aggregate of the multiple ceramic layers 14 between the first main surface 12a and the inner electrode layer 16 closest to the first main surface 12a.

The second outer layer portion 15c is adjacent to the second main surface 12b of the multilayer body 12 and is an aggregate of the multiple ceramic layers 14 between the second main surface 12b and the inner electrode layers 16 closest to the second main surface 12b.

The effective layer portion 15a is located between the first outer layer portion 15b and the second outer layer portion 15c.

The multilayer body 12 may have freely-selected dimensions and preferably has, for example, a dimension in the length direction z of about 0.2 mm or more and about 10.0 mm or less, a dimension in the width direction y of about 0.1 mm or more and about 10.0 mm or less, and a dimension in the height direction x of about 0.1 mm or more and about 5.0 mm or less.

The ceramic layers 14 can be made of, for example, a dielectric material as a ceramic material. As the dielectric material, a dielectric ceramic material including a component, such as $BaTiO_3$, $CaTiO_3$, $SrTiO_3$, or $CaZrO_3$, for example, can be used. In the case where the dielectric material is included as a main component, the ceramic material may further include an accessory component, such as, for example, a Mn compound, an Fe compound, a Cr compound, a Co compound, or a Ni compound, in a smaller amount than the main component in accordance with desired characteristics of the multilayer body 12.

In the case where the multilayer body 12 includes a piezoelectric ceramic material, the resulting multilayer ceramic electronic component defines and functions as a piezoelectric ceramic element. Specific examples of the piezoelectric ceramic material include lead zirconate titanate (PZT)-based ceramic materials.

In the case where the multilayer body 12 includes a semiconductor ceramic material, the resulting multilayer ceramic electronic component defines and functions as a thermistor element. Specific examples of the semiconductor ceramic material include spinel-based ceramic materials.

In the case where the multilayer body 12 includes a magnetic ceramic material, the resulting multilayer ceramic electronic component defines and functions as an inductor element. When the component defines and functions as an inductor element, the inner electrode layers 16 defines and functions as a substantially coil-shaped conductor. Specific examples of the magnetic ceramic material include ferrite ceramic materials.

Each of the fired ceramic layers 14 preferably has a thickness of about 0.4 μm or more and about 10.0 μm or less, for example.

As illustrated in FIGS. 2 and 3, the multilayer body 12 includes, as the multiple inner electrode layers 16, multiple first inner electrode layers 16a and multiple second inner electrode layers 16b, for example, having a rectangular or substantially rectangular shape. The multiple first inner electrode layers 16a and the multiple second inner electrode layers 16b are embedded so as to be alternately arranged at regular or substantially regular intervals in the lamination direction of the multilayer body 12. The first inner electrode layers 16a and the second inner electrode layers 16b may be arranged so as to be in parallel or substantially parallel to or perpendicular or substantially perpendicular to the mount surface.

The first inner electrode layers 16a include first opposite electrode portions 18a opposite the second inner electrode layers 16b and first extended electrode portions 20a located one end side of the first inner electrode layers 16a and extending from the first opposite electrode portions 18a to the first end surface 12e of the multilayer body 12. The first extended electrode portions 20a include end portions extending to and exposed at the first end surface 12e.

The second inner electrode layers 16b include second opposite electrode portions 18b opposite the first inner electrode layers 16a and second extended electrode portions 20b located one end side of the second inner electrode layers 16b and extending from the second opposite electrode portions 18b to the second end surface 12f of the multilayer body 12. The second extended electrode portions 20b include end portions extending to and exposed at the second end surface 12f.

The shape of the first opposite electrode portions 18a of the first inner electrode layers 16a and the second opposite electrode portions 18b of the second inner electrode layers 16b is preferably, but not necessarily, a rectangular or substantially rectangular shape. The corner portions may have a substantially round shape or a substantially sharp (tapered) shape.

The shape of the first extended electrode portions 20a of the first inner electrode layers 16a and the second extended electrode portions 20b of the second inner electrode layers 16b is preferably, but not necessarily, a rectangular or substantially rectangular shape. The corner portions may have a substantially round shape or a substantially sharp (tapered) shape.

The width of the first opposite electrode portions 18a of the first inner electrode layers 16a and the width of the first extended electrode portions 20a of the first inner electrode layers 16a may be the same or substantially the same, for example. Alternatively, one of them may be smaller than the other. Similarly, the width of the second opposite electrode portions 18b of the second inner electrode layers 16b and the width of the second extended electrode portions 20b of the second inner electrode layers 16b may be the same or substantially the same. Alternatively, one of them may be smaller than the other.

The multilayer body 12 includes side portions (W gaps) 22a of the multilayer body 12, one of the W gaps 22a being located between the first side surface 12c and one end of each first opposite electrode portion 18a and between the first side surface 12c and one end of each second opposite electrode portion 18b in the width direction y, the other W gap 22a being located between the second side surface 12d and the other end of the first opposite electrode portion 18a and between the second side surface 12d and the other end of the second opposite electrode portion 18b in the width direction y. The multilayer body 12 also includes end portions (L gaps) 22b of the multilayer body 12, the L gaps being located between the second end surface 12f and end portions of the first inner electrode layers 16a opposite the first extended electrode portions 20a and between the first end surface 12e and end portions of the second inner electrode layers 16b opposite the second extended electrode portions 20b.

The inner electrode layers 16 include an appropriate conductive material, such as a metal, e.g., Ni, Cu, Ag, Pd, or Au, an alloy, e.g., an Ag—Pd alloy, containing at least one of these metals. The inner electrode layers 16 may further include dielectric particles having the same or substantially the same composition as the ceramic material included in the ceramic layers 14.

The inner electrode layers 16 preferably have a thickness of about 0.2 μm or more and about 2.0 μm or less, for example. The number of the inner electrode layers 16 is preferably 15 or more and 200 or less, for example.

Outer electrodes 24 are disposed on the first end surface 12e side and the second end surface 12f side of the multilayer body 12. The outer electrodes 24 include a first outer electrode 24a and a second outer electrode 24b.

The outer electrodes 24 include underlying electrode layers 26 including a metal component and a glass component and plating layers 30 on surfaces of the underlying electrode layers 26.

The first outer electrode 24a is connected to the first inner electrode layers 16a and disposed on the first end surface 12e. The first outer electrode 24a extends from the first end surface 12e to a portion of the first main surface 12a, a portion of the second main surface 12b, a portion of the first side surface 12c, and a portion of the second side surface 12d. In this case, the first outer electrode 24a is electrically connected to the first extended electrode portions 20a of the first inner electrode layers 16a.

The second outer electrode 24b is connected to the second inner electrode layers 16b and disposed on the second end surface 12f. The second outer electrode 24b extends from the second end surface 12f to a portion of the first main surface 12a, a portion of the second main surface 12b, a portion of the first side surface 12c, and a portion of the second side surface 12d. In this case, the second outer electrode 24b is electrically connected to the second extended electrode portions 20b of the second inner electrode layers 16b.

In the multilayer body 12, an electrostatic capacity is obtained by the fact that the first opposite electrode portions 18a of the first inner electrode layers 16a face the second opposite electrode portions 18b of the second inner electrode layers 16b with the ceramic layers 14 interposed therebetween. Thus, the electrostatic capacity can be obtained between the first outer electrode 24a to which the first inner electrode layers 16a are connected and the second outer electrode 24b to which the second inner electrode layers 16b are connected, thereby developing the characteristics of the capacitor.

The underlying electrode layers 26 include a first underlying electrode layer 26a and a second underlying electrode layer 26b.

The first underlying electrode layer 26a is disposed on the first end surface 12e of the multilayer body 12 and extends from the first end surface 12e so as to cover a portion of the first main surface 12a, a portion of the second main surface 12b, a portion of the first side surface 12c, and a portion of the second side surface 12d.

The second underlying electrode layer 26b is disposed on the second end surface 12f of the multilayer body 12 and extends from the second end surface 12f so as to cover a portion of the first main surface 12a, a portion of the second main surface 12b, a portion of the first side surface 12c, and a portion of the second side surface 12d.

The first underlying electrode layer 26a may be disposed only on the first end surface 12e of the multilayer body 12. The second underlying electrode layer 26b may be disposed only on the second end surface 12f of the multilayer body 12.

A configuration when the underlying electrode layers 26 are baked layers will be described below.

Each of the baked layers includes a glass component and a metal component. The glass component in the baked layer includes at least one selected from, for example, B, Si, Ba, Mg, Al, and Li. The metal component in the baked layer includes at least one selected from, for example, Cu, Ni, Ag, Pd, Ag—Pd alloys, and Au. The baked layer may include multiple layers. The baked layer is formed, for example, by applying a conductive paste including the glass component and the metal component to the multilayer body 12 and baking the conductive paste. A multilayer chip including the inner electrode layers 16 and the ceramic layers 14 before firing and the conductive paste applied to the multilayer chip may be co-fired. A multilayer chip including the inner electrode layers 16 and the ceramic layers 14 before firing is fired into the multilayer body 12, and then the conductive paste may be applied to the multilayer body 12 and baked. When the baked layers are formed by co-firing the multilayer chip including the inner electrode layers 16 and the ceramic layers 14 and the conductive paste applied to the multilayer chip, the baked layers are preferably formed by the addition of a ceramic material in place of the glass component.

First and second baked layers, which are the first and second underlying electrode layers 26a and 26b, located on the first end surface 12e and the second end surface 12f in the middle portion in the height direction x preferably have a thickness of, for example, about 10 μm or more and about 160 μm or less.

In the case where the underlying electrode layers 26 are disposed on the first main surface 12a, the second main surface 12b, the first side surface 12c, and the second side surface 12d, the first and second baked layers, which are the first and second underlying electrode layers 26a and 26b, located on the first main surface 12a, the second main surface 12b, the first side surface 12c, and the second side surface 12d in the middle portion in the length direction z preferably have a thickness of, for example, about 5 μm or more and about 40 μm or less.

As illustrated in FIG. 2, the underlying electrode layers 26 include multiple void portions 27 therein. The multiple void portions 27 are minute spaces and randomly provided inside the underlying electrode layers 26.

Barrier films 28a are filled into the void portions 27 disposed inside the underlying electrode layers 26. Moreover, a barrier film 28b cover the surfaces of the multilayer body 12 excluding the ranges where the outer electrodes 24 are disposed. The barrier films 28a may be disposed on portions of the surfaces of the underlying electrode layers 26. The barrier film 28b need not cover the surfaces excluding the ranges where the outer electrodes 24 are disposed.

The barrier films 28a and 28b preferably have insulating properties. As an insulating material, for example, a thin alumina film, an organic material, or an inorganic material can be selected. Examples of the inorganic material that can be used include oxides, such as $SiO_2$, $Al_2O_3$, and $TiO_2$, and nitrides.

The plating layers 30 include a first plating layer 30a and a second plating layer 30b.

The first plating layer 30a and the second plating layer 30b, which are the plating layers 30 that can be disposed on the underlying electrode layers 26, will be described below with reference to FIGS. 2 and 3.

Each of the first plating layer 30a and the second plating layer 30b includes at least one selected from, for example, Cu, Ni, Sn, Ag, Pd, Ag—Pd alloys, and Au.

The first plating layer 30a covers the first underlying electrode layer 26a.

The second plating layer 30b covers the second underlying electrode layer 26b.

Each of the first plating layer 30a and the second plating layer 30b may include multiple layers. In this case, each of the plating layers 30 preferably has a two-layer structure that includes, for example, a lower plating layer 32 made of Ni plating and disposed on a corresponding one of the underlying electrode layers 26 and an upper plating layer 34 made of Sn plating and disposed on the lower plating layer 32.

That is, the first plating layer 30a includes a first lower plating layer 32a and a first upper plating layer 34a on a surface of the first lower plating layer 32a.

The second plating layer 30b includes a second lower plating layer 32b and a second upper plating layer 34b on the second lower plating layer 32b.

The lower plating layer 32 made of Ni plating is used to prevent solder leaching of the underlying electrode layers 26 when the multilayer ceramic capacitor 10 is mounted. The upper plating layer 34 made of Sn plating is used to improve solder wettability during the mounting of the multilayer ceramic capacitor 10 to facilitate the mounting.

Each of the plating layers preferably has a thickness of about 2.0 μm or more and about 15.0 μm or less, for example.

The dimension of the multilayer ceramic capacitor 10 including the multilayer body 12, the first outer electrode 24a, and the second outer electrode 24b in the length direction z is defined as a dimension L. The dimension of the multilayer ceramic capacitor 10 including the multilayer body 12, the first outer electrode 24a, and the second outer electrode 24b in the height direction x is defined as a dimension T. The dimension of the multilayer ceramic capacitor 10 including the multilayer body 12, the first outer electrode 24a, and the second outer electrode 24b in the width direction y is defined as a dimension W.

The multilayer ceramic capacitor 10 may have freely-selected dimensions and preferably has, for example, a dimension L in the length direction z of about 0.2 mm or more and about 7.5 mm or less, a dimension W in the width direction y of about 0.1 mm or more and about 3.5 mm or less, and a dimension T in the height direction x of about 0.2 mm or more and about 3.5 mm or less. The dimension L in the length direction z is not necessarily longer than the dimension W in the width direction y. The dimensions of the multilayer ceramic capacitor 10 can be measured with a microscope.

In the multilayer ceramic capacitor 10 illustrated in FIG. 1, the void portions 27 inside the underlying electrode layers 26 are filled with the barrier films 28a, and the barrier film 28b covers the surfaces of the multilayer body 12 where the outer electrodes 24 are not disposed. Thus, it is possible to reduce or prevent the penetration of moisture from the outside to improve the moisture resistance reliability and to maintain a low ESR.

2. Method for Manufacturing Multilayer Ceramic Capacitor

A non-limiting example of a method for manufacturing a multilayer ceramic capacitor, which is a multilayer ceramic electronic component, will be described below.

A ceramic paste including a ceramic powder is applied in a sheet form by a screen printing method, for example, and dried to produce ceramic green sheets.

A conductive paste for forming inner electrodes is provided. The conductive paste for forming inner electrodes is applied on the ceramic green sheets in a predetermined pattern by, for example, a screen printing method or gravure printing. Thus, the ceramic green sheets including conductive patterns for forming inner electrodes and the ceramic green sheets without the conductive patterns for forming inner electrodes are prepared.

The ceramic paste and the conductive paste for forming inner electrodes may include, for example, a known organic binder and a known solvent.

A predetermined number of the ceramic green sheets for outer layers without the conductive patterns for forming inner electrodes are laminated. The ceramic green sheets including the conductive patterns for forming inner electrodes are then laminated thereon. A predetermined number of the ceramic green sheets without the conductive patterns for forming inner electrodes are laminated. Thus, a mother multilayer body is produced. At this time, the multiple ceramic green sheets including the conductive patterns for forming inner electrodes are laminated such that the extended portions of the conductive patterns for forming inner electrodes are alternately arranged, thus producing laminated sheets.

The laminated sheets are subjected to pressure bonding by, for example, isostatic pressing into a multilayer block.

The multilayer block is cut into green multilayer chips having a predetermined shape and predetermined dimensions. At this time, the corner portions and the ridge portions of the multilayer chips may be rounded by, for example, barrel polishing.

Each of the resulting green multilayer chips is fired to produce the multilayer body 12 in which the first inner electrode layers and the second inner electrode layers are disposed inside the multilayer body, the first inner electrode layers extend to the first end surface, and the second inner electrode layers extend to the second end surface. The firing temperature of the green multilayer chips depends on the ceramic material and the material of the conductive paste for forming inner electrodes and is preferably about 900° C. or higher and about 1,300° C. or lower, for example.

Next, the outer electrodes 24 are formed on the multilayer body 12.

Figure 4:
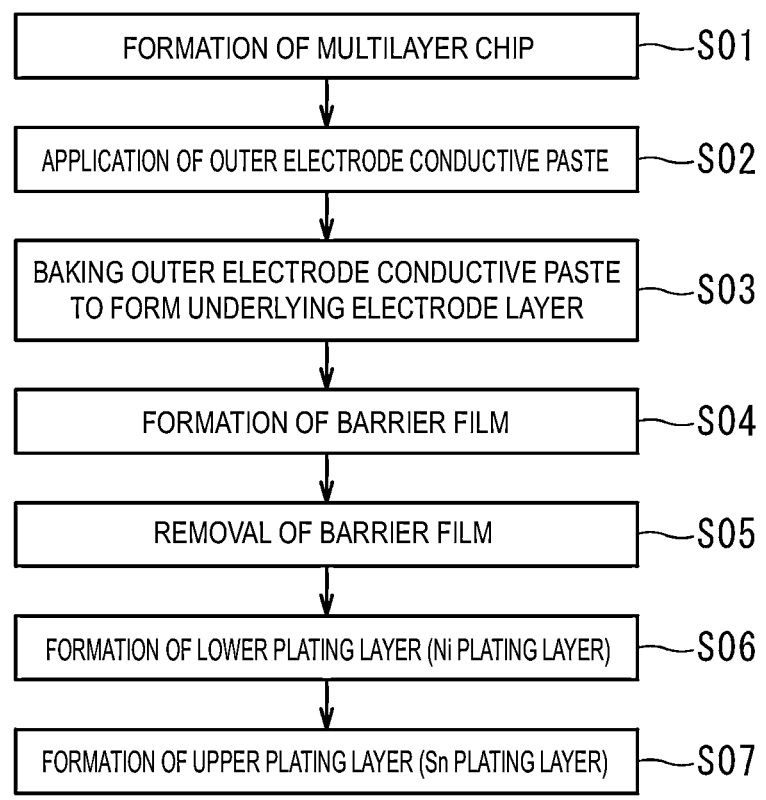
FIG. 4 is a flow chart of a procedure for forming outer electrodes and barrier films in a method for manufacturing a multilayer ceramic capacitor according to a preferred embodiment of the present invention.

FIG. 4 is a flow chart of a procedure for forming outer electrodes and barrier films in a non-limiting example of a method for manufacturing a multilayer ceramic capacitor according to a preferred embodiment of the present invention. FIGS. 5A to 5D are schematic sectional views illustrating a method for forming outer electrodes and barrier films of a multilayer ceramic capacitor according to a preferred embodiment of the present invention.

Figure 5:
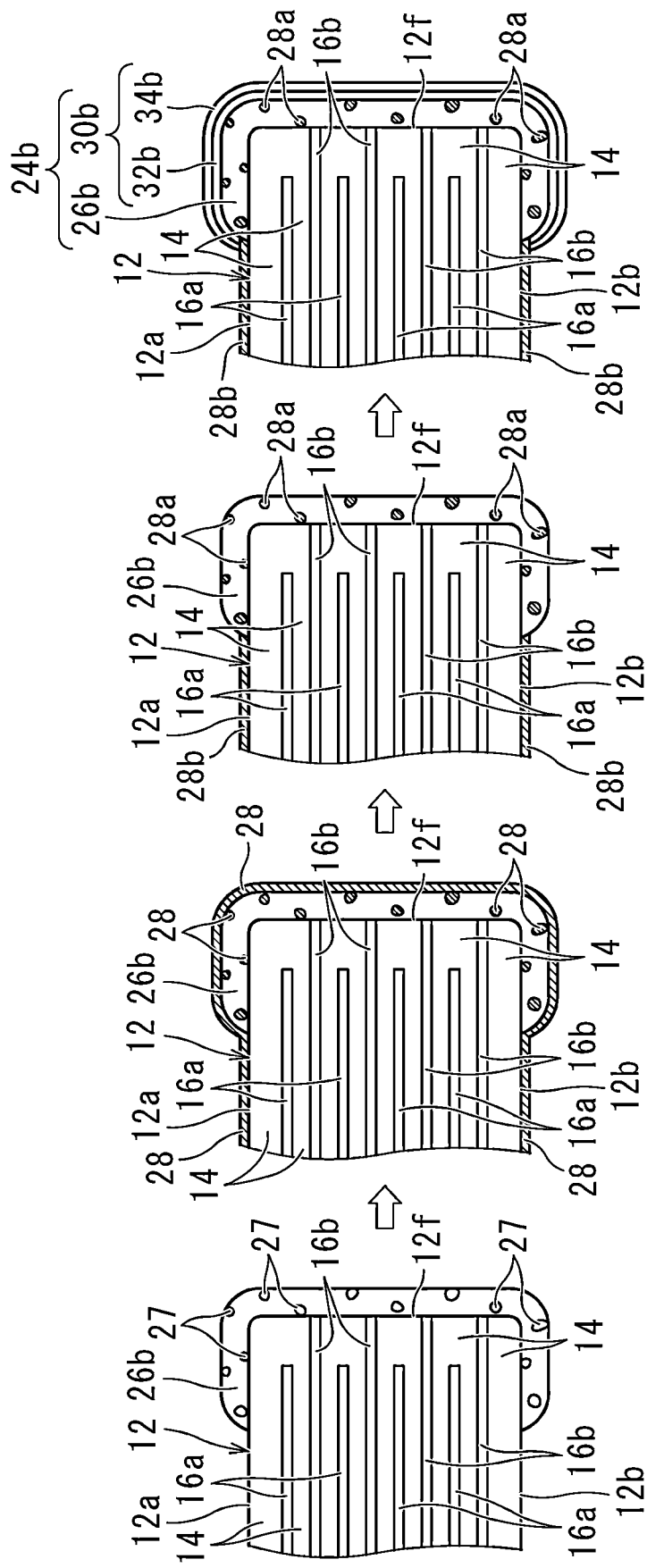
FIGS. 5A to 5D are schematic sectional views illustrating a procedure for forming outer electrodes and barrier films of a multilayer ceramic capacitor according to a preferred embodiment of the present invention.

After the multilayer body 12 is formed (S01), the underlying electrode layers 26 are formed as illustrated in FIG. 5A. An outer electrode conductive paste is applied to both end surfaces of the fired multilayer chip (S02). The applied outer electrode conductive paste is baked to form baked layers defining and functioning as the first underlying electrode layer 26a of the first outer electrode 24a and the second underlying electrode layer 26b of the second outer electrode 24b (S03). In the case of forming the baked layers, a conductive paste including a glass component and a metal component is applied by, for example, dipping and subjected to baking treatment to form the baked layers serving as the underlying electrode layers 26. The baking temperature is preferably about 700° C. or higher and about 900° C. or lower, for example.

As illustrated in FIG. 5B, a step of forming barrier films 28 on the multilayer body 12 including the underlying electrode layers 26 is performed (S04). At this time, the barrier films 28 are formed on the surfaces of the underlying electrode layers 26 and the surfaces of the multilayer body 12 excluding regions where the underlying electrode layers 26 are disposed. That is, at this time, the barrier films 28 are formed on the entire or a portion of the surface of each of the underlying electrode layers 26.

The formation of the barrier films 28 can be performed by a liquid-phase method or gas-phase method, for example. Since the void portions 27 inside the underlying electrode layers 26 are minute spaces, a gas-phase method is preferred for uniform treatment.

The formation of the barrier films 28 is preferably performed by an atomic layer deposition (ALD) method, for example. In the ALD method, a substance to be formed into the barrier films is gasified. Thus, the barrier films can be effectively formed.

Moreover, in the ALD method, uniform vapor deposition treatment can be performed. Thus, the barrier film 28b can also be formed on the surfaces of the multilayer body 12. The first outer electrode 24a is preferably insulated from and the second outer electrode 24b by the barrier film 28b. Since the barrier film 28b is formed between the first outer electrode 24a and the second outer electrode 24b, it is possible to prevent a short circuit between the first outer electrode 24a and the second outer electrode 24b. As an insulating material, for example, a thin alumina film, an organic material, or an inorganic material can be selected. Examples of the inorganic material that can be used include oxides, such as $SiO_2$, $Al_2O_3$, and $TiO_2$, and nitrides.

The ALD method is a technique for vapor-depositing a thin film or protective film on a surface of a substrate. This method differs from common vapor deposition techniques for chemically vapor-depositing thin films in that atomic layers grow in a layer-by-layer fashion. The use of the ALD method facilitates the thickness adjustment of a thin film and enables the formation of a uniform thin film having excellent step-coverage.

As illustrated in FIG. 5C, a step of removing the barrier films formed on the surfaces of the underlying electrode layers 26 (S05) is performed, as needed. The barrier films can be removed by acid treatment, for example. The barrier films may also be removed with a plating solution, for example.

Only the barrier films formed on the surfaces of the underlying electrode layers 26 can be selectively removed. An acid solution does not penetrate to the barrier films filled into the void portions 27 inside the underlying electrode layers 26. Thus, the barrier films can be maintained in the void portions 27.

This can further reduce the equivalent series resistance (ESR).

As illustrated in FIG. 5D, the lower plating layers 32 are formed on the surfaces of the underlying electrode layers 26 (S06). The upper plating layers 34 are formed on the lower plating layers 32 (S07). The outer electrodes 24 are formed by these steps. In the multilayer ceramic capacitor 10 illustrated in FIG. 1, Ni plating layers are formed as the lower plating layers 32 on the underlying electrode layers 26. Sn plating layers are formed as the upper plating layers 34. The lower plating layers 32 and the upper plating layers 34 are formed by, for example, an electrolytic plating method or an electroless plating method. Each of the plating layers preferably includes multiple layers.

The multilayer ceramic capacitor 10 illustrated in FIG. 1 is manufactured in the manner described above.

3. Experimental Examples

To confirm the advantageous effects of the above-described multilayer ceramic capacitor according to a preferred embodiment of the present invention, multilayer ceramic capacitors were manufactured and subjected to an ESR measurement test, checking of the formability of a plating layer, and a moisture resistance reliability test.

(1) Specifications of Samples in Example

Multilayer ceramic capacitors having the following specifications according to Example of a preferred embodiment of the present invention were manufactured in accordance with the above-described method for manufacturing a multilayer ceramic capacitor.

Example

Structure of multilayer ceramic capacitor: two terminals (see FIGS. 1 to 3)
Dimensions of multilayer ceramic capacitor L×W×T (including design values): about 1.0 mm×about 0.5 mm×about 0.5 mm
Material of ceramic layer: $BaTiO_3$
Capacitance: about 10 μF
Rated working voltage: about 6.3 V
Structure of inner electrode layer
Metal component: Cu
Structure of outer electrode
Underlying electrode layer
Metal component: Ni
Plating layer: two-layer structure of Ni plating layer and Sn plating layer (2) Specifications of Samples in Comparative Examples Multilayer ceramic capacitors having the following specifications according to Comparative Examples were manufactured.

Comparative Example 1

The multilayer ceramic capacitors according to Comparative Example 1 had the same or substantially the same specifications as the multilayer ceramic capacitors according to Example, except that no barrier films were formed.

Figure 6:
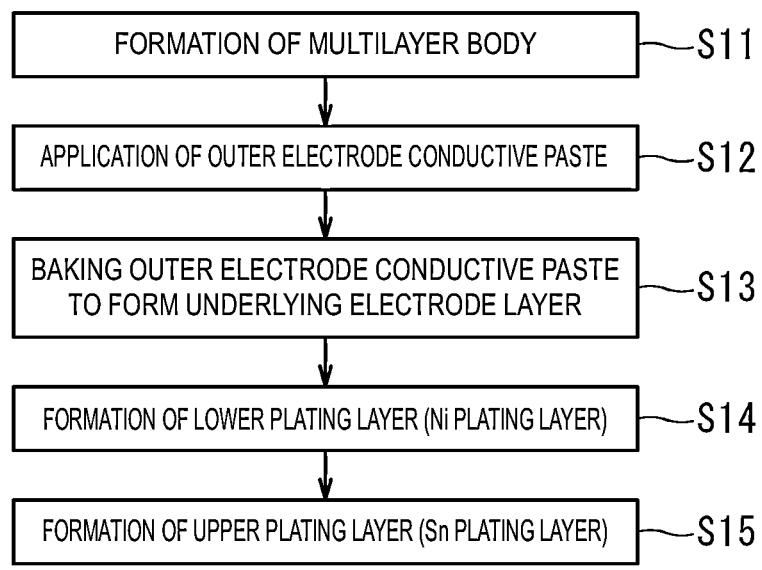
FIG. 6 is a flow chart of a procedure for forming outer electrodes in a method for manufacturing a multilayer ceramic capacitor according to Comparative Example 1.
Figure 7:
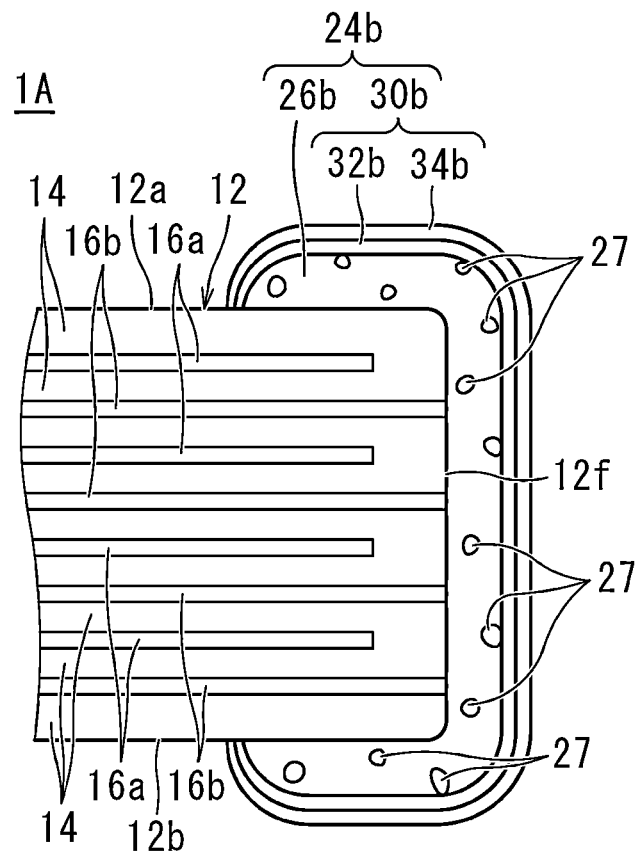
FIG. 7 is a schematic sectional view illustrating a region at and around an outer electrode of a multilayer ceramic capacitor according to Comparative Example 1.

FIG. 6 is a flow chart of a procedure for forming outer electrodes in a method for manufacturing a multilayer ceramic capacitor according to Comparative Example 1. FIG. 7 is a schematic sectional view illustrating a region at and around an outer electrode of a multilayer ceramic capacitor according to Comparative Example 1.

As illustrated in FIG. 6, in the step of forming outer electrodes of a multilayer ceramic capacitor 1A according to Comparative Example 1, a multilayer body was formed (S11), and then an outer electrode conductive paste was applied to both end surfaces of the multilayer body (S12). The applied outer electrode conductive paste was baked to form underlying electrode layers (S13). Ni plating layers were formed as lower plating layers on the surfaces of the underlying electrode layers (S14). Then Sn plating layers were formed as upper plating layers (S15).

As illustrated in FIG. 7, in the multilayer ceramic capacitor 1A according to Comparative Example 1, no barrier films were formed on the surfaces of the multilayer body 12. No barrier films were filled into the void portions 27 inside the underlying electrode layers 26.

Comparative Example 2

The multilayer ceramic capacitors according to Comparative Example 2 had the same or substantially the same specifications as the multilayer ceramic capacitors according to Example, except that the barrier films were formed on all surfaces of the multilayer body 12 and no barrier films were filled into the void portions in the underlying electrode layers.

Figure 8:
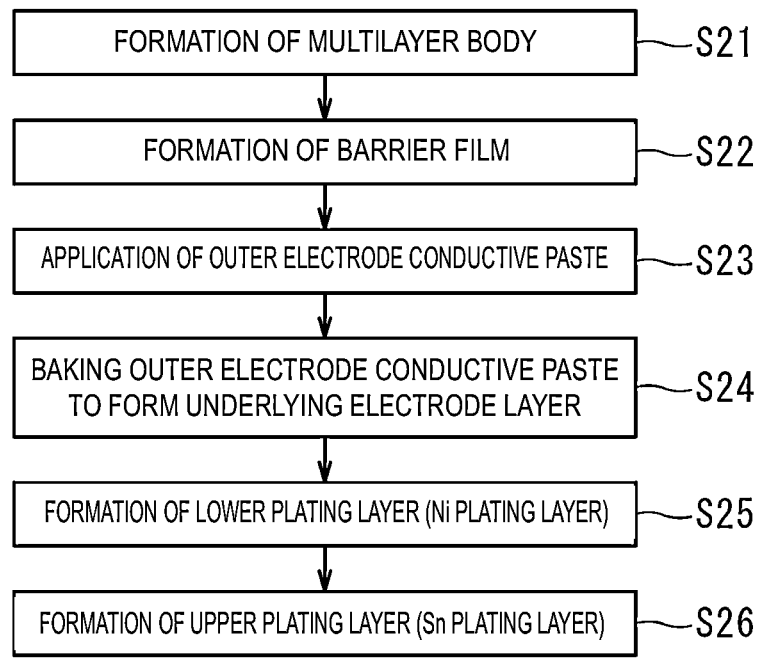
FIG. 8 is a flow chart of a procedure for forming outer electrodes and barrier films in a method for manufacturing a multilayer ceramic capacitor according to Comparative Example 2.
Figure 9:
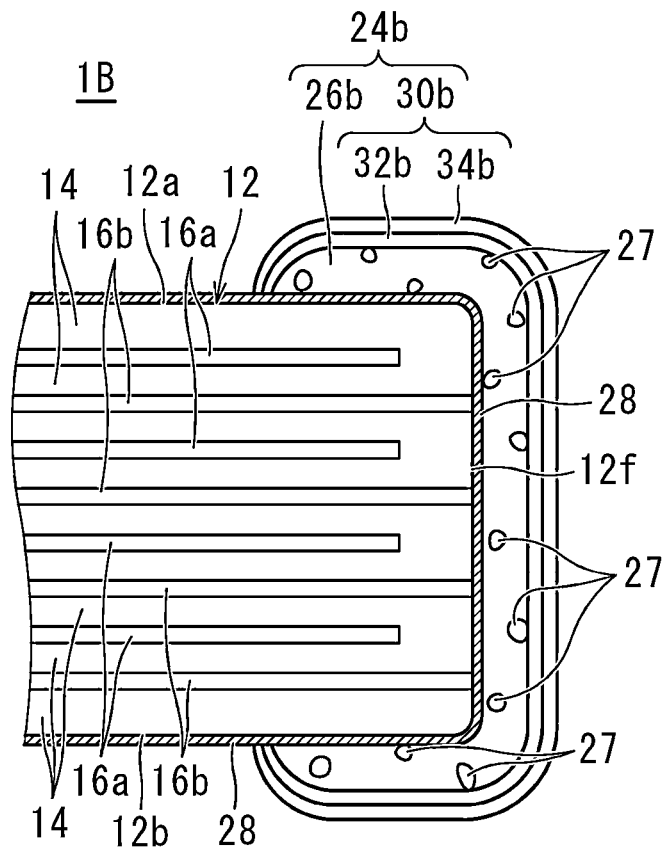
FIG. 9 is a schematic sectional view illustrating a region at and around an outer electrode of a multilayer ceramic capacitor according to Comparative Example 2.

FIG. 8 is a flow chart of a procedure for forming outer electrodes in a method for manufacturing a multilayer ceramic capacitor according to Comparative Example 2. FIG. 9 is a schematic sectional view illustrating a region at and around an outer electrode of a multilayer ceramic capacitor according to Comparative Example 2.

As illustrated in FIG. 8, in the step of forming outer electrodes of a multilayer ceramic capacitor 1B according to Comparative Example 2, a multilayer body was formed (S21), and then barrier films were formed on the surfaces of the multilayer body (S22). An outer electrode conductive paste was applied to the surfaces of the barrier films on both end surfaces of the multilayer body (S23). The applied outer electrode conductive paste was baked to form underlying electrode layers (S24). Ni plating layers were formed as lower plating layers on the surfaces of the underlying electrode layers (S25). Then Sn plating layers were formed as upper plating layers (S26).

As illustrated in FIG. 9, in the multilayer ceramic capacitor 1B according to Comparative Example 2, the barrier films were formed only on all surfaces of the multilayer body 12, and no barrier films were filled into the void portions 27 inside the underlying electrode layers 26.

Comparative Example 3

The multilayer ceramic capacitors according to Comparative Example 3 had the same or substantially the same specifications as the multilayer ceramic capacitors according to Example, except that the barrier films were formed on the surfaces of the multilayer body 12 where the outer electrodes were not formed, the void portions inside the underlying electrode layers were filled with the barrier films, and the barrier films were formed so as to cover the surfaces of the underlying electrode layers.

Figure 10:
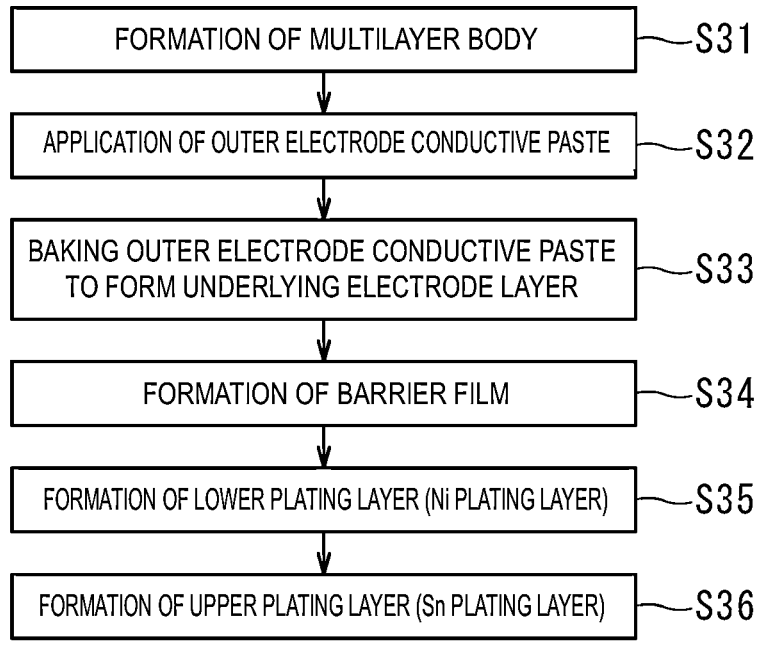
FIG. 10 is a flow chart of a procedure for forming outer electrodes and barrier films in a method for manufacturing a multilayer ceramic capacitor according to Comparative Example 3.
Figure 11:
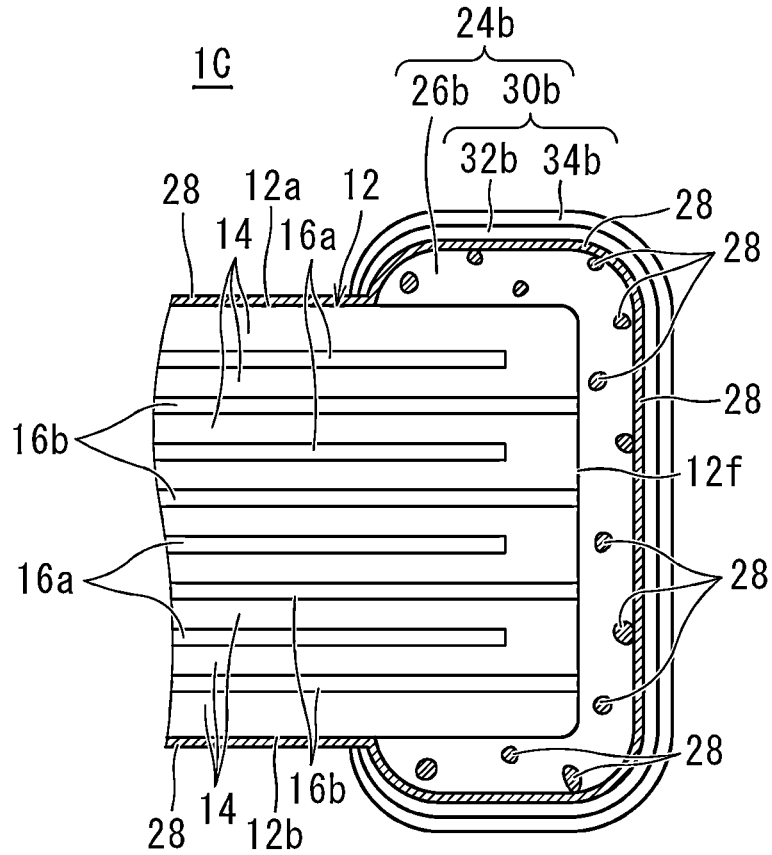
FIG. 11 is a schematic sectional view illustrating a region at and around an outer electrode of a multilayer ceramic capacitor according to Comparative Example 3.

FIG. 10 is a flow chart of a procedure for forming outer electrodes in a method for manufacturing a multilayer ceramic capacitor according to Comparative Example 3. FIG. 11 is a schematic sectional view illustrating a region at and around an outer electrode of a multilayer ceramic capacitor according to Comparative Example 3.

As illustrated in FIG. 10, in the step of forming the outer electrodes of a multilayer ceramic capacitor 1C according to Comparative Example 3, a multilayer body was formed (S31), and then an outer electrode conductive paste was applied to both end surfaces of the multilayer body (S32). The applied outer electrode conductive paste was baked to form underlying electrode layers (S33). Barrier films were formed so as to cover the entire multilayer body including the underlying electrode layers (S34). Ni plating layers were formed as lower plating layers on the surfaces of the underlying electrode layers with the barrier films interposed therebetween (S35). Then Sn plating layers were formed as upper plating layers (S36).

As illustrated in FIG. 11, in the multilayer ceramic capacitor 1C according to Comparative Example 3, the barrier films were formed on all surfaces of the multilayer body 12, the barrier films were formed on the surfaces of the underlying electrode layers 26, and the void portions 27 inside the underlying electrode layers 26 were filled with the barrier films.

(3) Test Methods (a) ESR Measurement Test

A section of each of the samples was processed. When probes were attached to the inner electrode layer and the Sn plating layer, an ESR value of about 100Ω or less was evaluated as "good". The number of the samples was seven for each of Example and Comparative Examples. In Table 2, when two or more defective samples were found in the seven samples, the multilayer ceramic capacitors were evaluated as "unacceptable" and expressed as "poor". In other cases, they were expressed as "good".

Figure 12:
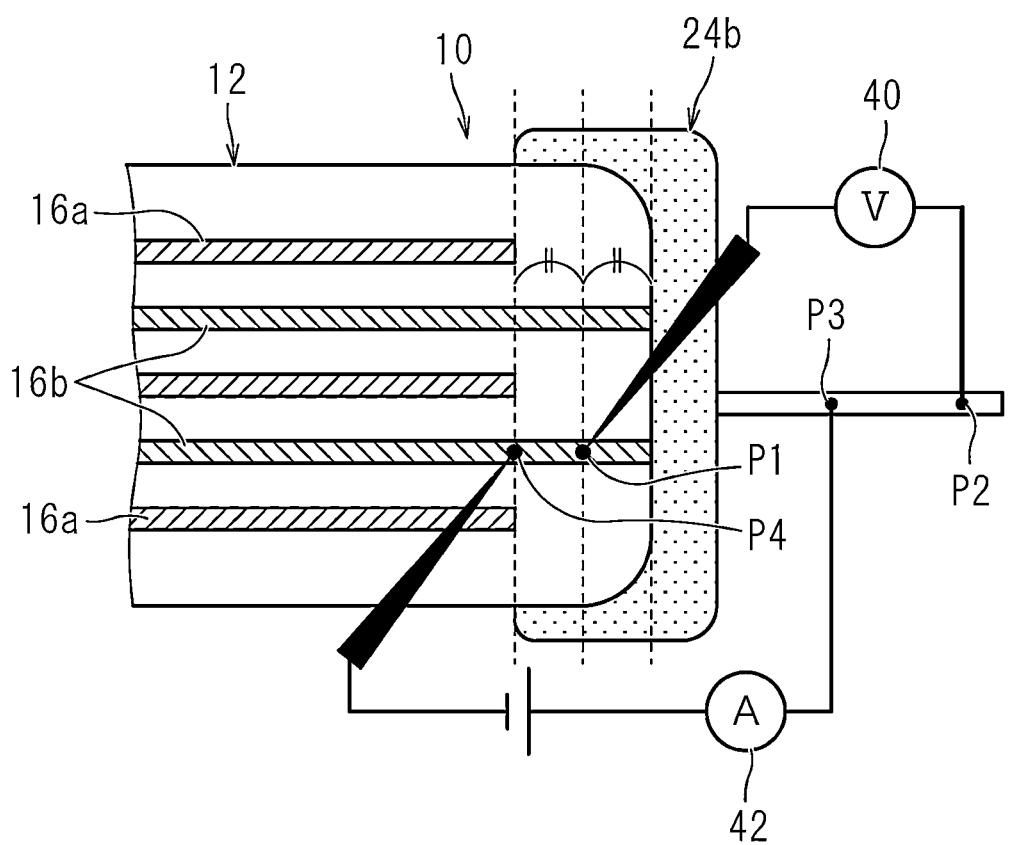
FIG. 12 is a schematic explanatory view of an experimental method for checking continuity.

The continuity was checked as follows: Each sample was polished to expose the LT section. A measuring instrument having the functions of a voltmeter 40 and an ammeter 42 was attached to positions P1, P2, P3, and P4 illustrated in FIG. 12. The resistance between P1 and P3 (about 2 cm to about 3 cm, for example) was measured by a four-point probe method. A digital multimeter (PC7000, available from Sanwa Electric Instrument Co., Ltd.) was used as a measuring instrument to measure the voltage between P1 and P2 and the current between P3 and P4.

In the case where the measurement voltage is about 100 mV and where continuity is established between the inner electrode layer and the outer electrode, it is possible to measure a current of about several hundred milliamperes according to Ohm's law. When the continuity is poor between the inner electrode layer and the outer electrode, the current is several tens of milliamperes or less.

(b) Checking of Formability of Plating Layer

The formability of the plating layer was checked as follows: The design value of the thickness of each of the Ni plating layers was about 2 μm. The Sn plating layers were peeled off. The Ni plating layers after peeling the Sn plating layers were observed with a scanning electron microscope (SEM). A Ni plating layer in which no pores having a pore size of about 1 μm or more were observed was evaluated as "good". The number of the samples was 10 for each of Example and Comparative Examples. In Table 2, when two or more defective samples were found in the 10 samples, the multilayer ceramic capacitors were evaluated as "unacceptable" and expressed as "poor". In other cases, they were expressed as "good".

(c) Moisture Resistance Reliability Test

The samples according to Example and the samples according to Comparative Examples were mounted on a board. The board was placed in a high-temperature and high-humidity chamber. A voltage of about 4 V was applied to each sample for about 200 hours in an environment at about 85° C. and a relative humidity of about 85% RH. Subsequently, the insulation resistance of each sample was measured after the moisture resistance reliability test.

The insulation resistance values before and after the moisture resistance reliability test were compared for each sample. A sample whose insulation resistance did not decrease by one or more orders of magnitude was evaluated as "good". The number of samples was 20 for each of Example and Comparative Examples. In Table 2, when 10% or more of the number of the samples were defective, the multilayer ceramic capacitors were evaluated as "unacceptable" and expressed as "poor". In other oases, they were expressed as "good".

Tables 1 and 2 provide the evaluation results.

TABLE 1

|  | ESR measurement test (pieces) | Formability of plating layer (pieces) | Moisture resistance reliability test (pieces) |
| --- | --- | --- | --- |
| Example | 7/7 | 10/10 | 20/20 |
| Comparative example 1 | 7/7 | 10/10 | 12/20 |
| Comparative example 2 | 2/7 | 10/10 | 20/20 |
| Comparative example 3 | 4/7 | 6/10 | 20/20 |

TABLE 2

|  | ESR measurement test | Formability of plating layer | Moisture resistance reliability test |
| --- | --- | --- | --- |
| Example | good | good | good |
| Comparative example 1 | good | good | poor |
| Comparative example 2 | poor | good | good |
| Comparative example 3 | poor | poor | good |

(4) Experimental Results

As is clear from Table 1, in the multilayer ceramic capacitors 10, which were the samples according to Example, the void portions inside the underlying electrode layers were filled with the barrier films, no barrier films were disposed on the surfaces of the underlying electrode layers, and the continuity between the inner electrode layers and the plating layers were established. Thus, each of the seven samples had an ESR value of about 100 mΩ or less. This demonstrated that the multilayer ceramic capacitors, which were the samples according to Example, can maintain a low ESR.

In the multilayer ceramic capacitors 10, which were the samples according to Example, the void portions inside the underlying electrode layers were filled with the barrier films, whereas no barrier films were disposed on the surfaces of the underlying electrode layers. Thus, in each of the 10 samples, the Ni plating layer was continuously deposited, and the formability of the plating layer was good.

In the multilayer ceramic capacitors 10, which were the samples according to Example, the barrier films covered the surfaces of the multilayer body where the outer electrodes were not disposed, and the void portions inside the underlying electrode layers were filled with the barrier films, thus reducing or preventing the penetration of moisture from the outside. The results of the moisture resistance reliability test indicated that none of the 20 samples were found to be defective.

In the multilayer ceramic capacitors 1A, which were the samples according to Comparative Example 1, since no barrier films were disposed, the continuity between the inner electrode layers and the plating layers were established. Thus, each of the seven samples had an ESR value of about 100 mΩ or less.

In the multilayer ceramic capacitors 1A, which were the samples according to Comparative Example 1, no barrier films were disposed on the surfaces of the underlying electrode layers. Thus, in each of the 10 samples, the Ni plating layer was continuously deposited, and the formability of the plating layer was good.

In the multilayer ceramic capacitors 1A, which were the samples according to Comparative Example 1, however, no barrier films were disposed on the surfaces of the multilayer body where the outer electrodes were not disposed, and the void portions inside the underlying electrode layers were not filled with the barrier films. Thus, the results of the moisture resistance reliability test indicated that in eight samples out of the 20 samples, the insulation resistance was decreased.

In the multilayer ceramic capacitors 1B, which were the samples according to Comparative Example 2, the barrier films were disposed on all surfaces of the multilayer body, and the void portions inside the underlying electrode layers were not filled with the barrier films. Thus, the continuity between the inner electrode layers and the plating layers was less likely to be established. In five samples out of the seven samples, the current value was several tens of milliamperes or less, and the ESR value was increased.

In the multilayer ceramic capacitors 1B, which were the samples according to Comparative Example 2, no barrier films were disposed of the surfaces of the underlying electrode layers. Thus, in each of the 10 samples, the Ni plating layer was continuously disposed, and the formability of the plating layer was good.

In the multilayer ceramic capacitors 1B, which were the samples according to Comparative Example 2, no barrier films were disposed of the surfaces of the underlying electrode layers, thus reducing or preventing the penetration of moisture from the outside. Thus, the results of the moisture resistance reliability test indicated that none of the 20 samples were found to be defective.

In the multilayer ceramic capacitors 1C, which were the samples according to Comparative Example 3, since the barrier films were disposed on the surfaces of the underlying electrode layers, the continuity between the inner electrode layers and the plating layers was less likely to be established. Thus, in three samples out of the seven samples, the current value was several tens of milliamperes or less, and the ESR value was increased.

In the multilayer ceramic capacitors 1C, which were the samples according to Comparative Example 3, the barrier films were disposed on the surfaces of the underlying electrode layers. Thus, in four samples out of the 10 samples, the formability of the plating layers was poor.

In the multilayer ceramic capacitors 1C, which were the samples according to Comparative Example 3, however, the barrier films were disposed on all surfaces of the multilayer body, the barrier films were disposed on the surfaces of the underlying electrode layers, and the void portions inside the underlying electrode layers were filled with the barrier films, thus reducing or preventing the penetration of moisture from the outside. Thus, the results of the moisture resistance reliability test indicated that none of the 20 samples were found to be defective.

The above-described results revealed that in the multilayer ceramic capacitor 10 according to a preferred embodiment of the present invention, the barrier films covered the surfaces of the multilayer body where the outer electrodes were not disposed, and the barrier films was filled into the void portions inside the underlying electrode layers to reduce or prevent the penetration of moisture from the outside, thus improving the moisture resistance reliability and maintaining a low ESR.

While the preferred embodiments of the present invention have been described above, the present invention is not limited thereto.

Various modifications can be made to the above-described preferred embodiments with regard to mechanisms, shapes, materials, quantities, positions, arrangements, or the like without departing from the scope of the technical idea of the present disclosure, and are included in the present disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component, comprising:
    a multilayer body including:
        multiple ceramic layers and multiple inner electrode layers that are laminated;
        a first main surface and a second main surface opposite to each other in a height direction;
        a first side surface and a second side surface opposite to each other in a width direction perpendicular or substantially perpendicular to the height direction; and
        a first end surface and a second end surface opposite to each other in a length direction perpendicular or substantially perpendicular to the height direction and the width direction;
    a first outer electrode on the first end surface; and
    a second outer electrode on the second end surface; wherein
    each of the first outer electrode and the second outer electrode includes an underlying electrode layer and a plating layer on the underlying electrode layer;
    multiple void portions inside the underlying electrode layer are each filled with a barrier film; and
    the barrier film is on a portion of a surface of the underlying electrode layer.

2. The multilayer ceramic electronic component according to claim 1, wherein the barrier film covers the surfaces of the multilayer body excluding regions where the first outer electrode and the second outer electrode are disposed.

3. The multilayer ceramic electronic component according to claim 1, wherein the barrier film is a thin alumina film.

4. The multilayer ceramic electronic component according to claim 1, wherein the underlying electrode layer includes a glass component and a metal component.

5. The multilayer ceramic electronic component according to claim 1, wherein
    the plating layer includes a lower plating layer and an upper plating layer on a surface of the lower plating layer; and
    the lower plating layer is a Ni plating layer, and the upper plating layer is a Sn plating layer.

6. The multilayer ceramic electronic component according to claim 1, wherein the multilayer ceramic electronic component is a multilayer ceramic capacitor.

7. The multilayer ceramic electronic component according to claim 1, wherein each of the multiple ceramic layers includes at least one of $BaTiO_3$, $CaTiO_3$, $SrTiO_3$, or $CaZrO_3$ as a main component.

8. The multilayer ceramic electronic component according to claim 7, wherein each of the multiple ceramic layers includes at least one of Mn compound, an Fe compound, a Cr compound, a Co compound, or a Ni compound as an accessory component.

9. The multilayer ceramic electronic component according to claim 1, wherein each of the multiple ceramic layers has a thickness of about 0.4 μm or more and about 10.0 μm or less.

10. The multilayer ceramic electronic component according to claim 1, wherein each of the multiple inner electrode layers includes at least one of Ni, Cu, Ag, Pd, or Au, or an alloy including at least one of Ni, Cu, Ag, Pd, or Au.

11. The multilayer ceramic electronic component according to claim 1, wherein each of the multiple inner electrode layers has a thickness of about 0.2 μm or more and about 2.0 μm or less.

12. A method for manufacturing a multilayer ceramic electronic component, the method comprising:
    providing a multilayer body including:
        multiple ceramic layers and multiple inner electrode layers that are laminated;
        a first main surface and a second main surface opposite each other in a height direction
        a first side surface and a second side surface opposite each other in a width direction perpendicular or substantially perpendicular to the height direction; and
        a first end surface and a second end surface opposite each other in a length direction perpendicular or substantially perpendicular to the height direction and the width direction;
    applying an outer electrode conductive paste to both of the first and second end surfaces to form underlying electrode layers;
    forming a barrier film on a surface of each of the underlying electrode layers; and
    forming at least one plating layer on an entirety or a portion of the surface of each of the underlying electrode layers; wherein
    in the forming the barrier film on the surface of each of the underlying electrode layers, the barrier film is filled into a void portion inside each of the underlying electrode layers.

13. The method according to claim 12, wherein the barrier film is formed by an atomic layer deposition method.

14. The method according to claim 12, wherein the barrier film is a thin alumina film.

15. The method according to claim 12, further comprising after the forming the barrier film on the surface of each of the underlying electrode layers, removing a portion of the barrier film formed on the surface of each of the underlying electrode layer.

16. The method according to claim 12, wherein the outer electrode conductive paste is a conductive paste including a glass component and a metal powder.

17. The method according to claim 12, wherein in the forming the at least one plating layer, the at least one plating layer includes a plurality of plating layers.

18. The method according to claim 12, wherein in the forming the at least one plating layer, the at least one plating layer includes a lower plating layer including Ni and an upper plating layer including Sn.

* * * * *